May 9, 1967 C. STOWELL ETAL 3,318,339
REINFORCED HOSE STRUCTURE
Filed April 7, 1964
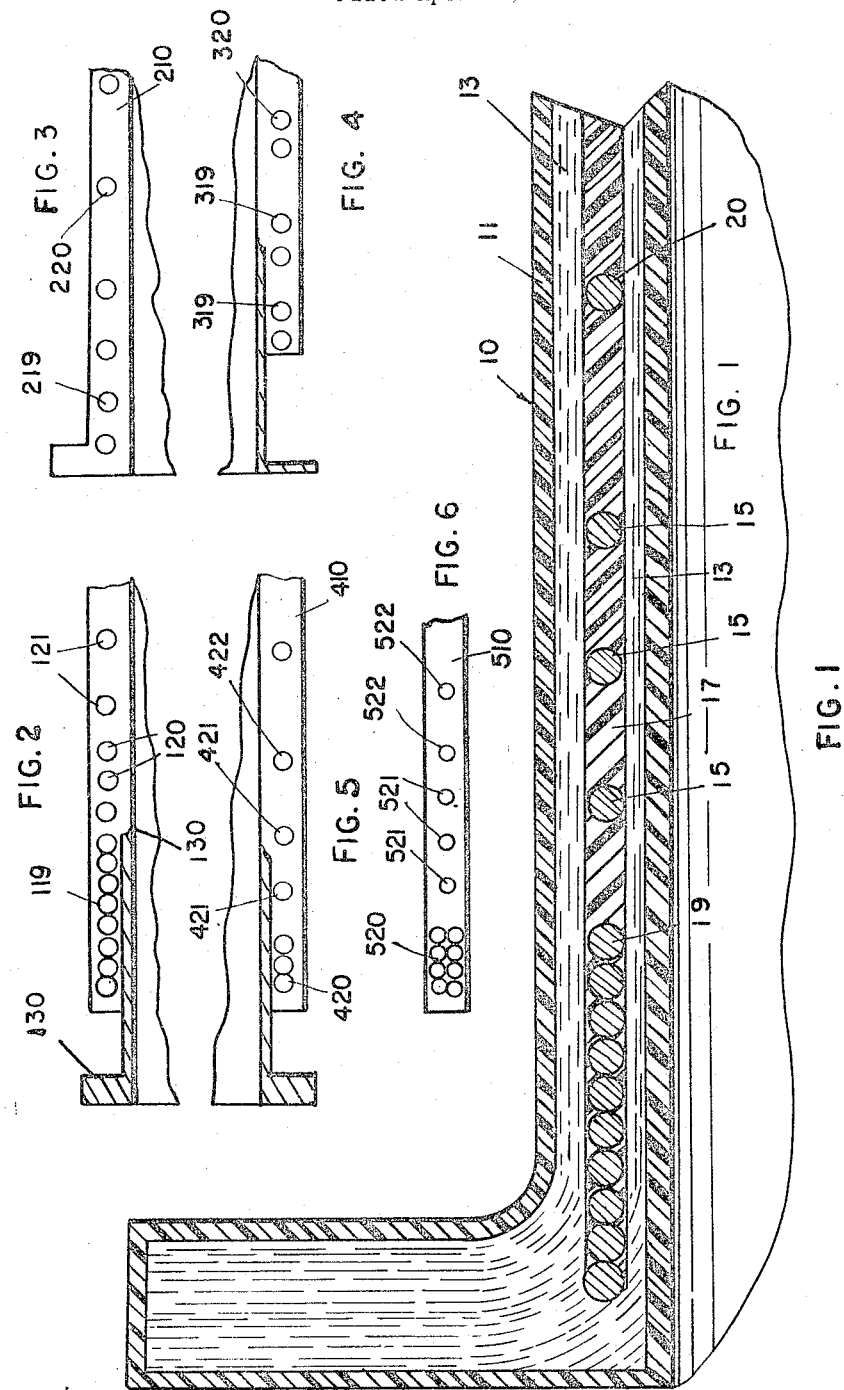
INVENTORS
CHARLES STOWELL
BY BENJAMIN HAYTOCK III
Charles L. Lovenbach
atty 3,318,339
REINFORCED HOSE STRUCTURE
Charles Stowell, Erie, and Benjamin Haytock III, Fairview, Pa., assignors to Continental Rubber Works, Erie, Pa., a corporation of Pennsylvania
Filed Apr. 7, 1964, Ser. No. 357,907
1 Claim. (Cl. 138—138)

This invention relates to flexible tubular members and, more particularly, to the type of flexible tubular members made for connection to dredges and the like.

Hoses that are used for dredges and the like are subjected to a stress concentration at a position directly adjacent the point where the hoses are connected to the dredge. This is therefore the point that the hose is most likely to fail.

It has been discovered that by imbedding reinforcing wire in the hose in a spiral fashion with the turns of the spiral concentric to the hose and closely spaced at the end of the hose and tapering to a wider spacing as the distance increases from the end of the hose, the stress concentration can be distributed and the hose can be strengthened at the point of stress concentration. Many failures of hose can thereby be eliminated. This procedure can be carried out at each end of the hose and where nipples and flanges are used in the construction of the hose, the closely wound wire would project beyond the nipple or flange as shown in the drawing. Building hoses according to the above structure will result in dynamic stability in both ends of the hose. The reinforcement at the ends of the hose will resist the abrading of an attaching nipple and the combination of wire and hose will result in a hose of increased strength and durability.

It is, accordingly, an object of the invention to provide an improved hose structure.

Another object of the invention is to provide a hose structure which is simple in construction, economical to manufacture, and simple and efficient to use.

A further object of the invention is to provide an improved hose structure incorporating embedded helical turns of wire which are closely spaced at the end of the hose and wherein the spacing of the wire turns gradually increases as the distance is spaced from the end.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

FIG. 1 is a partial longitudinal cross sectional view of a hose according to the invention;

FIG. 2 is a view similar to FIG. 1 of another embodiment of the invention; and

FIGS. 3, 4, 5, and 6 show other embodiments of the invention.

Now with more particular reference to the drawings, the hose 10 shown in FIG. 1 may be made up of conventional flexible hose construction having an outside cover made of rubber material at 11 and an inside lining tube 17 which is waterproof material such as rubber with fabric therebetween. The wire spiral turns 19 lie close together with their sides actually touching. All the turns of wire are contained in a matrix of rubber material 17 which may have abrasion resistant qualities. The material 13 between the rubber 11 and 17 could be of fabric in accordance with ordinary hose construction. The turns 15 of the spiral are spaced from each other a greater distance than the turns 19 and the turns 20 are spaced from each other a still greater distance. Thus, the spacing of the spiral wire increases as the distance increases from the end of the hose so that no stress concentration results in the hose.

In the embodiment of the invention shown in FIG. 2, the construction of the hose is similar to that shown in FIG. 1; however, the turns 119 of wire are very closely resting relative to each other and this close spacing extends beyond the inner end of the nipple 130. Nipple 130 may be bonded to the lining of the hose. The next group of turns 120 has a greater spacing and the next group of turns 121 has a still greater spacing.

In the embodiment of the invention shown in FIG. 3, the hose 210 is similar to that shown in the other embodiments in construction; however, the turns of wire 219 are spaced from each other slightly. Yet, turns 219 are more closely spaced than the turns 220, thus avoiding stress concentration.

In the embodiment of the invention shown in FIG. 4, the turns 319 are put in intermittently spaced groups and the turns 320 are put in spaced groups of turns which are, in turn at greater spacing than groups of turns 319.

In the embodiment shown in FIG. 5, the hose 410 is of construction similar to that of FIG. 1 but the first group of turns 420 are laying one against the other, the group 421 are more widely spaced and the group of turns 422 are still more widely spaced.

In the embodiment of the invention shown in FIG. 6, the hose 510 is of similar construction to that shown in FIG. 1 and the group of turns 520 are in engagement with each other and wound in layers shown of at least two layers of turns resting one against the other in each row and in each convolution. The group of turns 521 are spaced a greater distance from each other and the turns 522 are spaced a still greater distance from each other.

The foregoing specification sets forth the invention in its preferred practical forms but the structure shown is capable of modification within a range of equivalents without departing from the invention which is to be understood is broadly novel as is commensurate with the appended claim.

The embodiments of the invention in which an exclusive property or privilege is claimed are defined as follows:

In combination, a hose and reinforcing means therefor,
said hose comprising an outer cover made of abrasion resistant material,
a tubular lining of waterproof material,
a matrix tube of resilient material concentric to said lining and said cover and spaced substantially half way therebetween and spaced therefrom,
fabric material in the space between said cover, said matrix and said lining and said matrix,
said fabric material being attached to said lining, said cover, and said matrix,
a spiral wire imbedded in said matrix material and bonded thereto,
said wire having a plurality of turns adjacent the end thereof in engagement with each other and a plurality of turns further from said end at a greater spacing than said first turns said first turns being wound in at least two concentric layers, a nipple that goes inside an end of said hose and extending a distance thereinto, said first turns of wire being disposed concentric to said nipple and overlying the inner end thereof, a said plurality of said first groups of turns being provided adjacent said one end of said hose.

References Cited by the Examiner

UNITED STATES PATENTS

| | | | |
|---|---|---|---|
| 165,324 | 7/1875 | Greacen | 138—131 |
| 1,175,373 | 3/1916 | Noack | 138—109 |
| 2,854,030 | 9/1958 | Schulthess | 138—133 X |
| 3,119,415 | 1/1964 | Galloway et al. | 138—109 X |

FOREIGN PATENTS

| | | |
|---|---|---|
| 638,077 | 3/1962 | Canada. |
| 918,080 | 9/1954 | Germany. |
| 176,945 | 10/1961 | Sweden. |

LAVERNE D. GEIGER, *Primary Examiner.*

C. L. HOUCK, *Assistant Examiner.*